United States Patent
Naegle et al.

(10) Patent No.: US 9,761,049 B2
(45) Date of Patent: Sep. 12, 2017

(54) DETERMINATION OF MOBILE DISPLAY POSITION AND ORIENTATION USING MICROPOWER IMPULSE RADAR

(71) Applicant: Intel Corporation, Santa Clara, CA (US)

(72) Inventors: Nathaniel D. Naegle, Pleasanton, CA (US); Mark E. Sprenger, Folsom, CA (US); Paul J. Gwin, Orangevale, CA (US)

(73) Assignee: Intel Corporation, Santa Clara, CA (US)

( * ) Notice: Subject to any disclaimer, the term of this patent is extended or adjusted under 35 U.S.C. 154(b) by 134 days.

(21) Appl. No.: 14/229,630

(22) Filed: Mar. 28, 2014

(65) Prior Publication Data

US 2015/0279103 A1    Oct. 1, 2015

(51) Int. Cl.
*G09G 5/00*    (2006.01)
*G06T 19/00*   (2011.01)
(Continued)

(52) U.S. Cl.
CPC ........ *G06T 19/006* (2013.01); *G01S 13/0209* (2013.01); *G01S 13/18* (2013.01);
(Continued)

(58) Field of Classification Search
None
See application file for complete search history.

(56) References Cited

U.S. PATENT DOCUMENTS

| | | | | |
|---|---|---|---|---|
| 3,925,612 A | * | 12/1975 | Guanella | G06F 11/08 380/265 |
| 4,183,088 A | * | 1/1980 | Simmons | H03K 3/84 331/78 |

(Continued)

FOREIGN PATENT DOCUMENTS

| | | |
|---|---|---|
| JP | 2000-001298 | 1/2000 |
| KR | 2014-0007427 | 1/2014 |
| TW | 200812683 | 3/2008 |

OTHER PUBLICATIONS

Azevedo, Stephen et al., "Micropower Impulse Radar," Science and Technology Review, Jan./Feb. 1996, pp. 17-29.
(Continued)

*Primary Examiner* — Ryan R Yang
(74) *Attorney, Agent, or Firm* — Blakely, Sokoloff, Taylor & Zafman LLP

(57) ABSTRACT

Embodiments are generally directed to determination of mobile display position and orientation using micropower impulse radar. An embodiment of an apparatus includes a display to present images; radar components to generate radar signal pulses and to generate distance data based on received return signals; radar antennae to transmit the radar signal pulses and to receive the return signals; and a processor to process signals and data, wherein the processor is to: process the return signals received by the radar antennae to determine a position and orientation of the display with respect to real objects in an environment and to determine a position of a vantage point of a user of the apparatus, and generate an augmented image including rendering a virtual object and superimposing the virtual object on an image including one or more real objects, the rendering of the virtual image being based at least in part on the determined position and orientation of the display and the determined vantage point of the user of the apparatus.

18 Claims, 13 Drawing Sheets

(51) Int. Cl.
  *H04B 1/717* (2011.01)
  *G01S 13/02* (2006.01)
  *G01S 13/18* (2006.01)
  *G01S 13/48* (2006.01)
  *G06F 3/01* (2006.01)
  *G01S 13/89* (2006.01)

(52) U.S. Cl.
  CPC .............. *G01S 13/48* (2013.01); *G06F 3/011* (2013.01); *H04B 1/717* (2013.01); *G01S 13/89* (2013.01); *G06T 2215/16* (2013.01)

(56) References Cited

U.S. PATENT DOCUMENTS

| | | | |
|---|---|---|---|
| 5,345,471 A | 9/1994 | McEwan | |
| 5,361,070 A | 11/1994 | McEwan | |
| 5,457,394 A | 10/1995 | McEwan | |
| 5,465,094 A | 11/1995 | McEwan | |
| 5,510,800 A | 4/1996 | McEwan | |
| 5,512,834 A | 4/1996 | McEwan | |
| 5,517,198 A | 5/1996 | McEwan | |
| 5,519,400 A | 5/1996 | McEwan | |
| 5,521,600 A | 5/1996 | McEwan | |
| 5,523,760 A | 6/1996 | McEwan | |
| 5,563,605 A | 10/1996 | McEwan | |
| 5,573,012 A | 11/1996 | McEwan | |
| 5,576,627 A | 11/1996 | McEwan | |
| 5,581,256 A | 12/1996 | McEwan | |
| 5,589,838 A | 12/1996 | McEwan | |
| 5,609,059 A | 3/1997 | McEwan | |
| 5,610,611 A | 3/1997 | McEwan | |
| 5,630,216 A | 5/1997 | McEwan | |
| 5,661,385 A | 8/1997 | McEwan | |
| 5,661,490 A | 8/1997 | McEwan | |
| 5,682,164 A | 10/1997 | McEwan | |
| 5,754,144 A | 5/1998 | McEwan | |
| 5,757,320 A | 5/1998 | McEwan | |
| 5,766,208 A | 6/1998 | McEwan | |
| 5,767,953 A | 6/1998 | McEwan | |
| 5,774,091 A | 6/1998 | McEwan | |
| 5,805,110 A | 9/1998 | McEwan | |
| 5,832,772 A | 11/1998 | McEwan | |
| 5,883,591 A | 3/1999 | McEwan | |
| 6,166,744 A * | 12/2000 | Jaszlics | G06T 17/00 345/421 |
| 6,380,849 B1 | 4/2002 | Eckstine et al. | |
| 6,914,552 B1 | 7/2005 | McEwan | |
| 8,493,412 B2 * | 7/2013 | Suddreth | G01C 23/00 345/633 |
| 8,965,460 B1 * | 2/2015 | Rao | G06F 3/005 455/566 |
| 2003/0210228 A1 | 11/2003 | Ebersole et al. | |
| 2005/0093889 A1 | 5/2005 | Sauer et al. | |
| 2007/0156364 A1 * | 7/2007 | Rothkopf | G06F 1/1626 702/117 |
| 2010/0045701 A1 * | 2/2010 | Scott | G01S 5/163 345/633 |
| 2010/0125812 A1 * | 5/2010 | Hartman | G02B 27/01 715/848 |
| 2010/0182400 A1 * | 7/2010 | Nelson | G06T 7/0018 348/42 |
| 2010/0287500 A1 * | 11/2010 | Whitlow | G02B 27/01 715/810 |
| 2011/0095940 A1 | 4/2011 | Breed | |
| 2011/0166937 A1 | 7/2011 | Bangera et al. | |
| 2011/0216192 A1 | 9/2011 | Leung et al. | |
| 2011/0273437 A1 * | 11/2011 | Sanderson | H04N 13/0497 345/419 |
| 2012/0105475 A1 * | 5/2012 | Tseng | G01C 21/3611 345/633 |
| 2012/0229508 A1 | 9/2012 | Wigdor et al. | |
| 2012/0274498 A1 | 11/2012 | Hyde et al. | |
| 2014/0015858 A1 | 1/2014 | Chiu | |
| 2014/0063055 A1 * | 3/2014 | Osterhout | G06F 3/005 345/633 |
| 2014/0067269 A1 * | 3/2014 | Maerten | G01V 11/00 702/2 |
| 2014/0125700 A1 * | 5/2014 | Ramachandran | G06T 7/0065 345/633 |
| 2014/0168265 A1 * | 6/2014 | Ahn | B60R 1/00 345/633 |
| 2014/0172296 A1 * | 6/2014 | Shtukater | G01S 19/13 701/522 |
| 2014/0210856 A1 * | 7/2014 | Finn | G01C 15/002 345/633 |
| 2015/0042679 A1 * | 2/2015 | Jarvenpaa | G06T 19/006 345/633 |
| 2015/0154799 A1 * | 6/2015 | Rios | G06T 19/006 345/633 |

OTHER PUBLICATIONS

Kang, Kai et al., "Ultra-Wideband Respiratory Monitoring System," King's College London, 2006, 5 pages.
Martinez-Vazquez, A., et al., "UWB Mimo Radar Arrays for Small Area Surveillance Applications," DG Joint Research Centre, European Commission, 2007, 6 pages.
Micropower Impulse Radar (MIR) overview, Industrial Partnerships Office, Lawrence Livermore National Security, LLC, for Department of Energy's National Nuclear Security Administration, retrieved Jan. 17, 2014 at https://ipo.llnl.gov/?q=technologies-micropower_impulse_radar, 2 pages.
Staderini, Enrico M., "Everything you always wanted to know about UWB radar . . . : a practical introduction to the ultra wideband technology," University of Rome, 2001, 12 pages.
Tuechler, Michael et al., "Accuracy of an UWB localization system based on a CMOS chip," Proceedings of the 2nd Workshop on Positioning, Navigation and Communication (WPNC '05) & 1st Ultra-Wideband Expert Talk (UET '05), pp. 211-220.
First Office Action and Search Report (+English Translation) for Chinese Application No. 104104568 mailed on Feb. 22, 2016, 21 pages.
International Search Report and Written Opinion of the International Searching Authority dated May 19, 2015, in International Patent Application No. PCT/US2015/016416, 22 pages.
International Preliminary Report for PCT Application No. US2015/016416 mailed Oct. 13, 2016, 12 pages.
Office Action (+English Translation) in Korean Application No. 2016-7023644 dated Mar. 22, 2017, 16 pages.

* cited by examiner

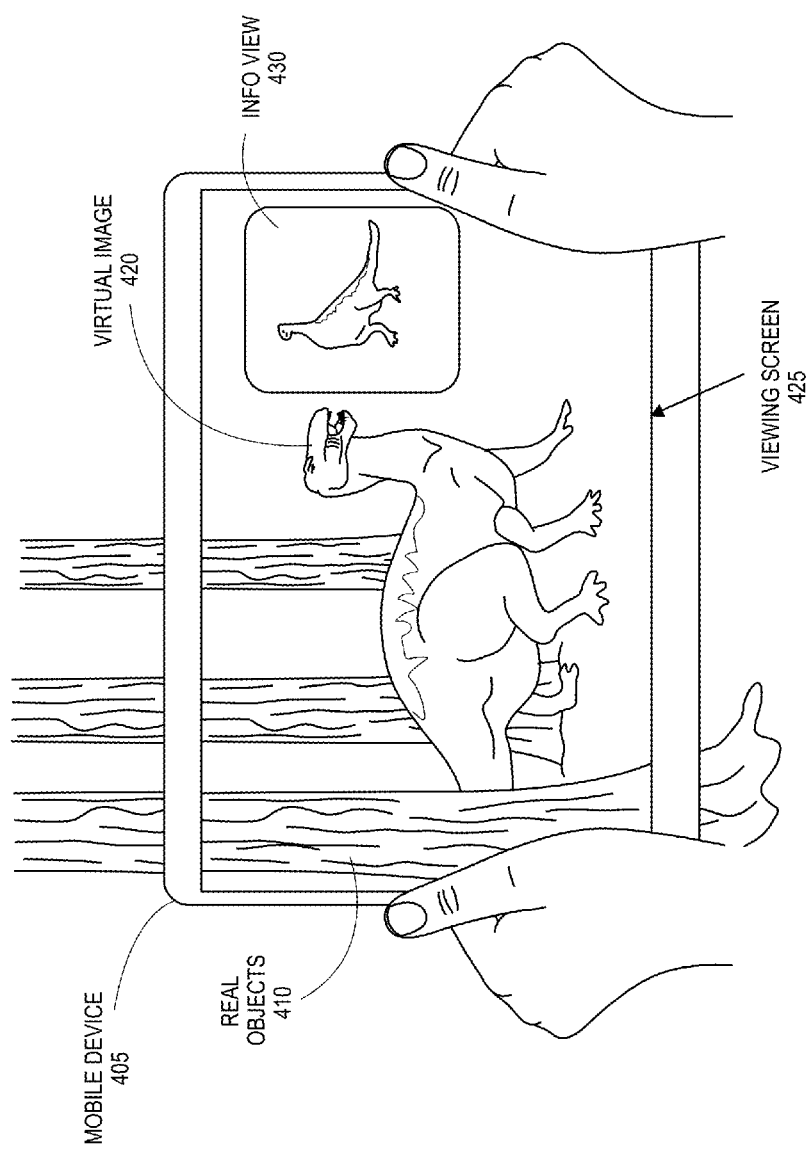

DETERMINATION OF MOBILE DISPLAY POSITION AND ORIENTATION USING MICROPOWER IMPULSE RADAR

TECHNICAL FIELD

Embodiments described herein generally relate to the field of electronic devices and, more particularly, determination of mobile display position and orientation using micropower impulse radar.

BACKGROUND

In the operation of a mobile electronic device, there may be a need for an accurate determination of the position and orientation of the device. In an example, an augmented reality image may combine images of an environment containing actual objects with images of virtual objects with the intent of providing a combined image that seamlessly merges such image components.

However, conventional systems often have difficulty in merging virtual and real images because of inaccuracy in the computed position for such elements in relation to a display being used to depict the augmented image. The inaccuracy in said computed position arises from insufficient accuracy in the measurement of position and orientation of the display being used to depict the augmented image. As a result, virtual images are often not well anchored to the environment, causing such images to often "swim" in the environment rather than naturally existing or moving in the environment.

Further, the merging of real and virtual objects requires an accurate depiction of occlusions in which a virtual object is partially hidden behind a real object. If positions and orientations are not accurately presented, the border between real objects and virtual objects will be inaccurate, which may create gaps in the augmented reality images rather than natural looking delineations between virtual and actual objects.

BRIEF DESCRIPTION OF THE DRAWINGS

Embodiments described here are illustrated by way of example, and not by way of limitation, in the figures of the accompanying drawings in which like reference numerals refer to similar elements.

FIG. 4A illustrates generation of an augmented reality image by a mobile device according to an embodiment;

DETAILED DESCRIPTION

Figure 1:
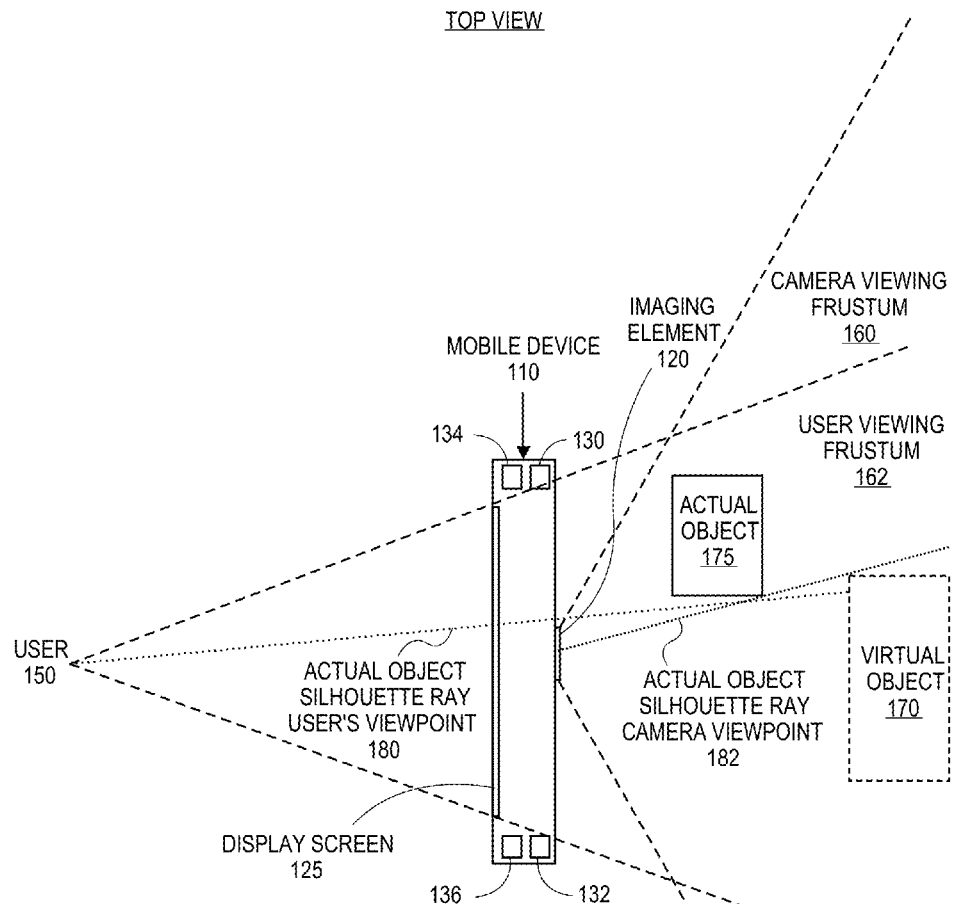
FIG. 1 illustrates an embodiment of a electronic device providing determination of position and orientation using micropower impulse radar.

Embodiments described herein are generally directed to determination of mobile display position and orientation using micropower impulse radar.

For the purposes of this description:

"Mobile device" means a tablet computer, 2-in-1 or detachable computer, smartphone, handheld computer, mobile Internet device, or other mobile electronic device that includes processing and image presentation capability.

"Micropower Impulse Radar" or "MIR" means a lower power radar system producing short electromagnetic pulses. An MIR component or system generally produces a ultra-wideband (UWB) signal using a large radio spectrum (greater than 500 MHz) in short pulses, and such component or system may be referred to as an ultra-wideband micropower impulse radar, or "UMIR". As used herein, radar systems are generally referred to as MIR systems or components, which include UMIR.

"Cover" or "case" means an outer portion of an electronic device that may enclose internal components of the device.

Electronic devices such as mobile devices may be used in augmented reality (AR) operations. Augmented reality systems render virtual objects visually superimposed upon the real world. In order for an augmented reality system that attempts to simulate actual, physical objects to appear natural to a viewer, the system is required to render the virtual objects in such a manner that the objects appear to the user to behave as real, physical objects. Among other factors, the virtual objects need to appear to be firmly anchored to the environment, and such objects must be occluded in the same manner as real objects if there are occluding portions of the real environment.

Augmented reality operation has been attempted with varying degrees of success by previous conventional systems. However, a common problem with conventional systems is that rendered virtual objects tend to "swim", or appear poorly anchored to the real environment, due to errors in sensing the position of the display relative to the environment as well as errors regarding the position of the user's dominant eye (or vantage point) in relation to the display. Further, an additional problem is that occluding features of the environment are difficult to identify and characterize, and thus conventional systems often poorly represent the occluding of virtual objects.

Conventional augmented reality systems have employed digital processing of video to address object location. However, an issue with such systems is that the systems only provide a 2D projection of the viewing frustum, where a viewing frustum is a three-dimensional space that is viewed from a particular viewpoint, such as the region viewed by a viewer through a display. Information about the actual depths in the scene is lost in the 2D projection, and it is computationally expensive to undo the projection. In addition, it is not usually possible to directly determine absolute distances or depths in the video scene without resorting to reference objects in the scene, and the use of such reference objects defeats the purpose of, for example, a self-contained mobile device used for augmented reality.

In some embodiments, an apparatus, system, and process provides augmented reality operation that addresses the "swimming" and occlusion problems by actively interrogating the real environment through means of radar elements (such as micropower impulse radar elements) to accurately determine the position and orientation of the display relative to the surrounding environment, and accurately determine the position and orientation of the display relative to the user's viewpoint.

FIG. 1 illustrates an embodiment of an electronic device providing determination of position and orientation using micropower impulse radar. In some embodiments, a device operates by utilizing ultra-wideband micropower impulse radar to construct a depth map of the environment within the viewing frustum of the mobile display, and to generate and update a viewing matrix to accurately place the user's viewing frustum in relation to the device. The generation of the position data includes determination of:

(a) The position and orientation of the plane of the mobile display relative to the environment, and (b) The position of the user's viewpoint relative to the display.

As illustrated in the top view provided in FIG. 1, a mobile device 110 is utilized for an augmented reality application. In some embodiments, the device 110 includes an imaging element 120, including but not limited to a rear facing camera, to capture an image of a real environment, where the real environment includes an actual object 175 within the camera viewing frustum 160 of the device, where FIG. 1 also illustrates the user viewing frustum 162. In some embodiments, the mobile device 110 generates and provides an augmented reality image to a user 150 on a display screen 125, wherein the augmented reality includes the addition of a virtual image 170.

However, the augmented reality image will not appear natural in its environment unless virtual objects are properly rooted to the environment and appear properly occluded by actual objects, such as object 175, that are closer to the user in terms of the virtual image. As illustrated in FIG. 1, the actual object silhouette ray from the camera viewpoint 182 may not indicate an occlusion of virtual object 170 by actual object 175, but the actual object silhouette ray from the user's viewpoint 182 demonstrates that from the user's viewpoint there is an occlusion of a portion of the virtual object 170.

In some embodiments, the mobile device includes multiple radar antennae, the antennae including multiple rear facing MIR antennae 130-132 for use in determining locations and distances of actual objects such as object 175, and may further include multiple front facing MIR antennae 134-136 for use in determining a position of the vantage point of the user 150. In some embodiments, the antennae are used to transmit and receive ultra micropower impulse radar signal pulses. MIR provides exceptional accuracy in determining positions of objects in very small time steps, and thus is a useful and powerful technology to perform these functions.

Commonly, 3D rendering programs use 3D transformation matrices to orient virtual models within the virtual world, and to position a virtual camera within the virtual world. In augmented reality applications, the viewing frustum 160 must correspond accurately to the user's viewpoint 150 and to the position and orientation of the mobile display in the real world. While depicted in two dimensions in FIG. 1, the viewing frustum has a shape that is approximately that of a four-sided pyramid with the user's viewpoint 150 at the apex of the pyramid shape. FIG. 1 further illustrates the different points of origin for the camera viewing frustum and the user frustum. In some embodiments, the difference between the viewpoints may be corrected by pre-processing the camera video to make it appear to have been captured from the user's viewpoint. In some embodiments, to accommodate a user 150 looking at the display 125 from off axis (i.e, not straight in front of the display), the camera viewing frustum 160 may be wider than the user viewing frustum such that the pre-processing of the camera video is to be capable of selecting the appropriate subset of the camera viewing frustum to match the user's viewing frustum. In some embodiments, a viewing matrix to describe such a viewing frustum is continuously calculated based upon the sensing of positions of key features in the environment. In some embodiments, the viewing matrix is then provided as a service of the mobile platform operating system to applications that wish to render virtual objects in a manner that appears well anchored to the real environment.

To handle occlusions in which a virtual object is hidden at least in part by a real object in augmented reality, 3D (three dimensional) imaging programs typically include the use of a Z- or depth-buffer. In some embodiments, a device's MIR components are used to update a depth map to provide current and accurate depth information. In some embodiments, a depth map gathered by the MIR can be used to pre-initialize a 3D program's Z-buffer, thus providing plausible information for occluding virtual objects by real objects. Objects in the real world that occupy a depth closer to the observer than the virtual object's depth will prevent occluded portions of the virtual object from being rendered, further enhancing the illusion that the virtual object inhabits the real world, as viewed through the mobile display. Specifically, the pre-initialized depths are required to be the distances from the user's eye-point, through each pixel of the display, to the nearest real object in the environment, as opposed to the orthogonal distance from the display plane to the objects.

MIR technology provides a direct means of interrogating the environment and determining absolute distances and angles, which provides a superior means of determining orientation and position of a display in an environment. In general, MIR components run at a speed that is at many times the 3D rendering frame rate, and thus the viewing matrix and depth map the MIR system provides are always fresh and locked to the positions of the user and the display.

Further, a MIR system is not generally subject to variations in ambient lighting conditions, as is video that passively gathers light from the scene. The radar energy used by MIR is not visible to human observers, so it can be used without interfering with the user's experience of the AR environment. This is generally not possible with video, which typically uses light spectra that is visible to human observers.

Figure 2:
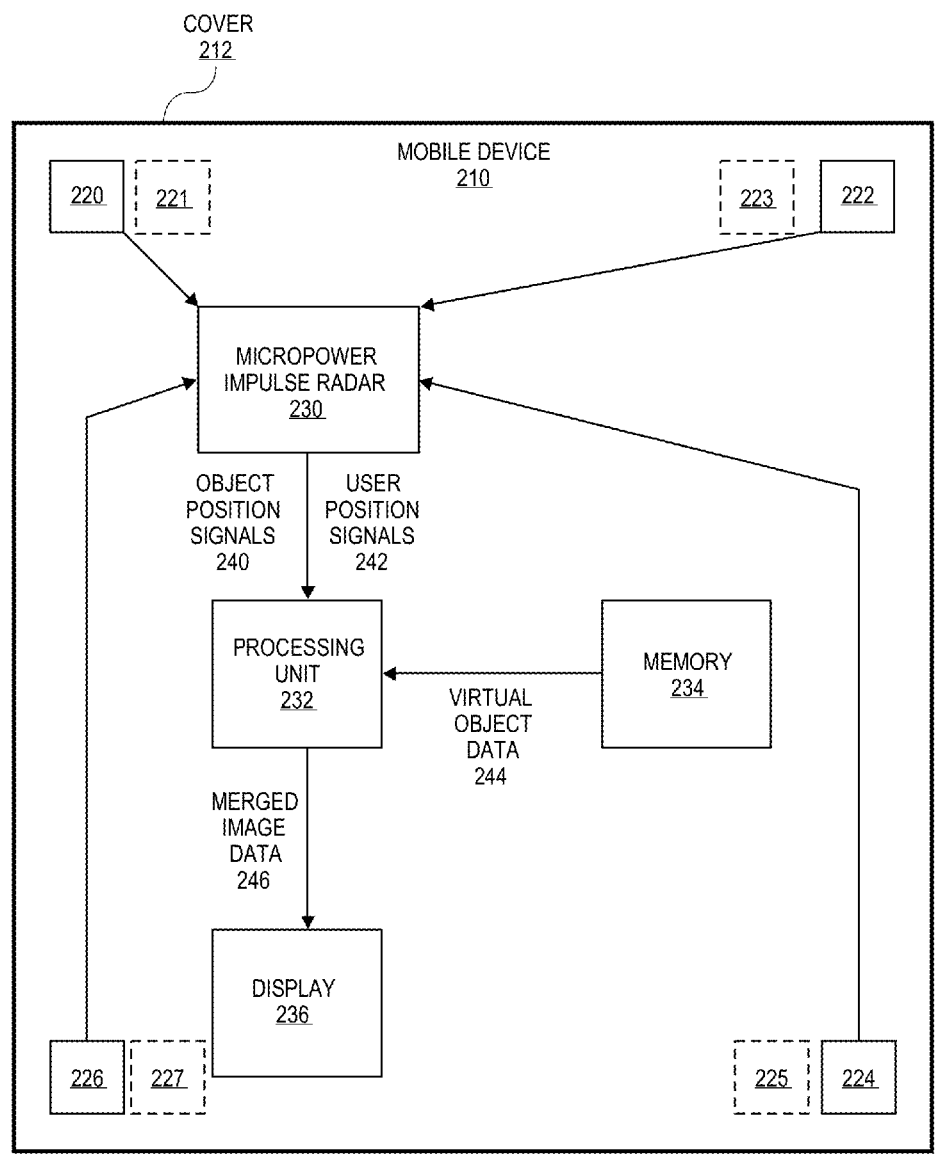
FIG. 2 illustrates a block diagram of elements of an apparatus according to an embodiment including determination of position and orientation using micropower impulse radar.

FIG. 2 illustrates a block diagram of elements of an apparatus according to an embodiment including determination of position and orientation using micropower impulse radar. In some embodiments, an apparatus such as the mobile device 210 includes a micropower impulse radar system including one or more MIR modules or sub-systems 230, wherein the mobile device further includes multiple MIR antennae, which are illustrated in FIG. 2 as an antenna at each corner of a cover 212 of the mobile device 210, the antennae being antenna 220 at a first corner, antenna 222 at a second corner, antenna 224 at a third corner, and antenna 226 at a fourth corner of the cover 212 of the device. In some embodiments, transmit and receive antennae may be one and the same. While connections for only a first set of radar antennae are shown in FIG. 2 for ease of illustration, in some embodiments the mobile device includes a first set of radar antennae to track object positions in first direction, such as the illustrated antennae 220, 222, 224, and 226, and a second set of radar antennae to track a position of the vantage point of user the mobile device (the dominant eye of the user of the mobile device), such as an additional set of antennae 221, 223, 225, and 227. In some embodiments, the mobile device may request and receive information regarding which eye of the user is the user's dominant eye, such as receiving such information from the user in an initial phase of the personalization of the mobile device by the user or requesting such information when a user first utilizes an augmented reality application.

In some embodiments, the MIR system 230 generates object position data 240 and user position data 242 that is provided to a processing unit 232. In some embodiments, the processing unit 232 further renders virtual images, which may include the use of certain virtual object data 244, wherein the data may be stored in a memory 234. In some embodiments, the processing unit 232 generates merged image data 246 including utilization of the updated viewing matrix and depth map, wherein the merged data is provided to a display 236 to provide the augmented reality image for the user. See, for example, the processes illustrated in FIG. 6 and described below.

Figure 3:
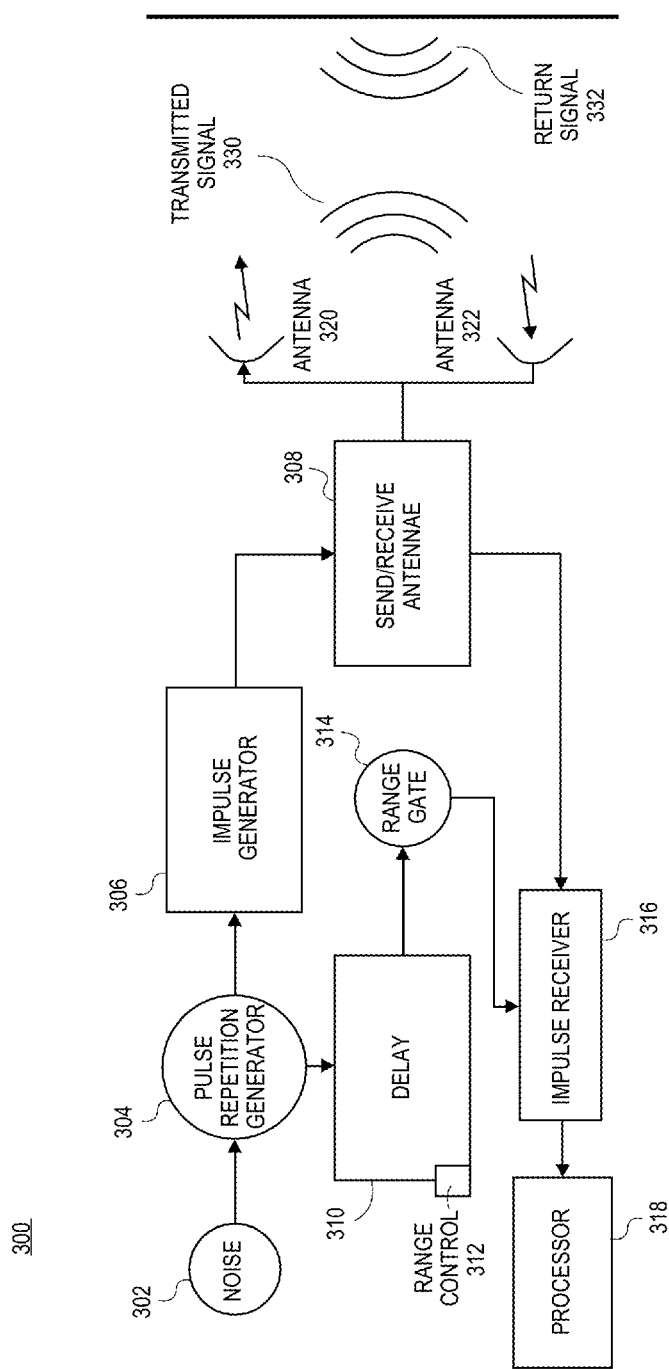
FIG. 3 illustrates a micropower impulse radar component or system according to an embodiment.

FIG. 3 illustrates a micropower impulse radar component or system according to an embodiment. In some embodiments, an MIR system 300 for augmented reality operation includes a noise source 302 to provide noise data to a pulse repetition generator 304 to vary the amount of time between signal pulses. The noise source is provided for the purpose of allowing multiple MIR radars to operate in the same space at the same time. The variable time between pulses, together with the extremely low duty-cycle (pulse width compared to pulse repetition rate) makes it extremely unlikely that a pulse from one MIR radar would be received and mistaken for a pulse sent from a second MIR radar operating in the same space. Therefore, MIR radar units have the desirable feature that they do not interfere with one another even when multiple units are simultaneously operating in the same space, such as, for example, multiple MIR units operating simultaneously in an embodiment of a mobile device. The pulse repetition generator provides a pulse signal to an impulse generator and to a delay 310, the delay including a range control 312.

The impulse generator 306 generates impulses for transmission via send/receiver antenna 308. A send antenna 320 produces a transmitted signal 330, which is reflected as a return signal 332 upon impacting an object. The return signal is received at a receive antenna 322 (which may be the same unit as the send antenna 320). The received signal is provided to an impulse receiver 316, which also receives a delayed pulse from the delay 310 as controlled by a range gate 314. The delay time is swept to take samples with an impulse receiver 316 at different times, and thus distances from the antennae, resulting in a record of pulses correlated to object distances. The impulse receiver 316 provides a resulting signal to a processor 318 to process the received signals to generate one or both of object position data and user position data. In some embodiments, the processor utilizes the object position data and virtual object data based upon a viewpoint of a user in the generation of images for an augmented reality display. During rendering of a virtual object, the z-buffer causes appropriate parts of the virtual object to be occluded and thus are not generated, which occurs prior to the alpha compositing operations, which merge camera and virtual image data. The alpha-compositing operations do not need to be aware of the z-buffer. However, the images that are generated match up correctly with the actual environment due to their accurate registration during the 3D rendering process.

As structured, a MIR system 300 can be very small in size and consume little power, and thus may be utilized in a mobile device having limited space and power capacity. The generated MIR impulses are very short compared to the repetition rate, even if said repetition rate is several Megahertz. For this reason, many MIR systems can be operating simultaneously in the same space, wherein the impulses from one MIR are not time-correlated with impulses from another because of the noise generation in the MIR system. Therefore, a MIR system 300 with the architecture illustrated in FIG. 3 has great immunity to extraneous signals, including impulses from multiple MIR components operating in the same space. This property allows several MIR components to operate in concert, operating simultaneously, in a mobile device without significant interference. It is further noted that MIR technology uses extremely low power levels, and thus the human exposure to the signal output from a device is generally a fraction of the RF power employed by a typical cellular phone.

In some embodiments, a mobile device such as a tablet computer includes multiple mounted MIR antennae in a spread pattern, such as an antenna mounted at each corner of the cover of the mobile device. In this example, four antennae may be facing the user (from the front of the device) and four antennae may be facing away from the user (from the rear of the device). From each such antenna it is possible to record time-of-flight for an impulse signal that is reflected. Each discrete time of flight of the radar impulse represents a surface of a sphere with center at a particular MIR that transmitted it. In this example, by combining measurements from each corner antenna, the intersection of four spheres of radius determined by the time of flight at each antenna is obtained. An object at a particular distance and heading from any three antennas facing in the same direction (toward or away from the user) will have returns in the three spheres that intersect at the point in space occupied by the object. Thus, by examining returns in appropriate radius spheres and by the use of well-known trigonometric algorithms applied to these measurements, radial distances from the user's eyepoint to objects in the environment can be computed and used to initialize a z-buffer.

In some embodiments, by making an assumption that objects appear stationary relative to a tablet computer at the rate at which measurements are made, and by discarding objects or features in the environment that do not remain in static spatial relationships to one another (or in other words, by discarding objects that move), it is thus possible to accurately determine the position and orientation of the tablet computer relative to the environment sampled by the array of MIRs.

FIG. 4A illustrates generation of an augmented reality image by a mobile device according to an embodiment. In FIG. 4, a mobile device 410, such as a tablet computer, is utilized for augmented reality in a natural setting. As illustrated, a virtual image 420 (the dinosaur) is superimposed upon the real environment in the viewing screen 425.

In order to portray a virtual object such as the dinosaur image 420 in FIG. 4 realistically for a viewer, it is necessary that the position of the virtual object does not appear to move unnaturally relative to the environment, such as, in this example, moving unnaturally relative to the ground. Although the dinosaur virtual image itself may appear to move in the scene, the feet of the dinosaur should not appear to move relative to the ground for as long as the feet are in contact with the ground. In addition, a portion of the virtual object, the tail of the dinosaur image 420, is partially occluded by a real object, a tree. In order to provide a realistic and natural augmented reality image, it is necessary that the intersection of the tree and the tail be aligned accurately relative to the user's viewpoint such that the portion of the virtual object that is occluded appears to disappear at the precise location (sometimes called the silhouette edge) where the tree begins.

The position of a virtual object depends upon the numerical values in the viewing matrix, which in turn depends upon the shape and orientation of the viewing frustum. In some embodiments, a viewing matrix is produced using MIR data with values that precisely position the virtual object in a virtual world that is superimposed upon the real world everywhere within the viewing frustum defined by the user's viewpoint (more specifically, the user's dominant eye), and the edges of the display area of the tablet.

Figure 4B:
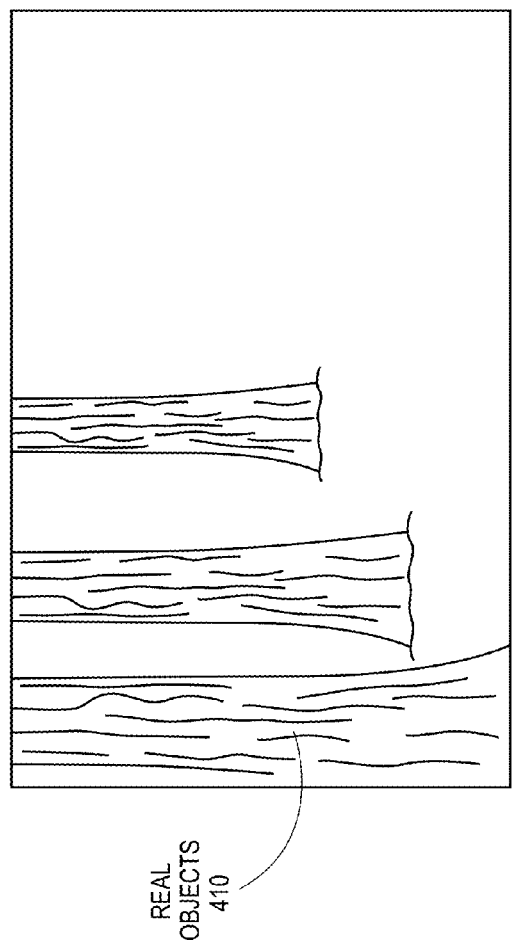
FIG. 4B illustrates an adjusted camera view of the environment according to an embodiment.

FIGS. 4B through 4G illustrate the generation and superimposition of images to create the augmented reality image provided in FIG. 4A according to an embodiment:

FIG. 4B illustrates an adjusted camera view of the environment according to an embodiment, showing real objects 410 such as the illustrated trees of the environment. In some embodiments, the adjusted camera view is generated by capturing the actual environment and adjusting the view of the environment such such the view matches the view of the dominant eye of the user. This may be seen as the adjustment of the camera viewing frustum 160 to match the current user viewing frustum 162, as illustrated in FIG. 1.

Figure 4C:
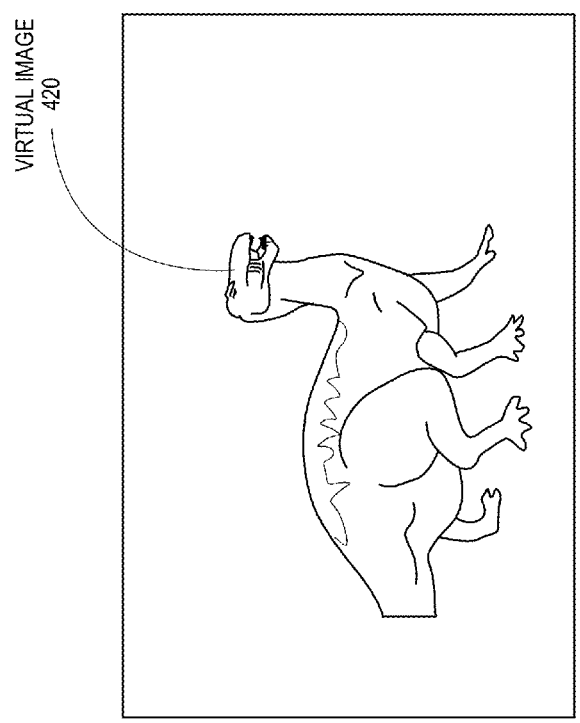
FIG. 4C illustrates the rendering of a virtual object view for use in an augmented reality image according to an embodiment.

FIG. 4C illustrates the rendering of a virtual object view for use in an augmented reality image according to an embodiment. In some embodiments, a virtual image 420 is rendered for augmented reality imaging based on current position information, wherein the rendering of the image excludes image portions that would be occluded by real objects. In this example, based on the virtual distance of the image and the distances of the actual objects as determined by MIR, a portion of the virtual image is not rendered. In some embodiments, the portion that is not rendered is located at the determined actual object silhouette from the user's viewpoint, such as defined by the actual object silhouette ray from the user's viewpoint 180 illustrated in FIG. 1.

Figure 4D:
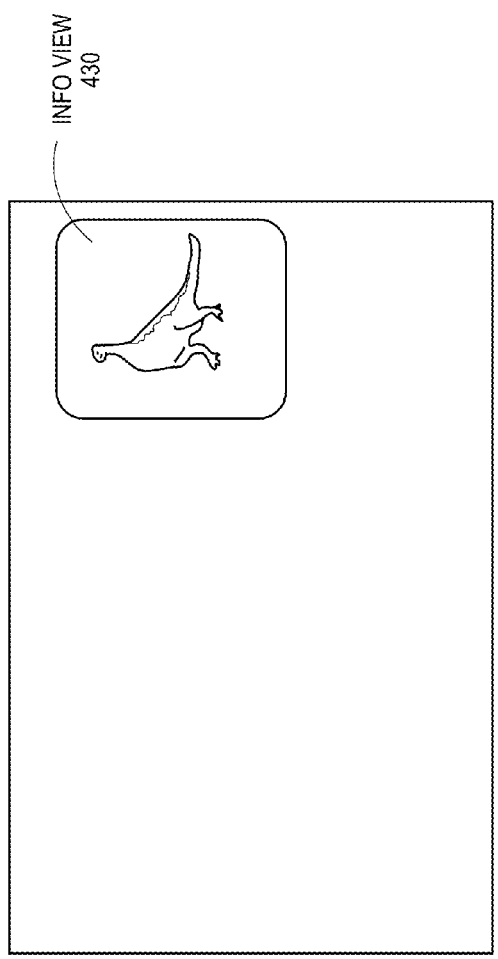
FIG. 4D illustrates a virtual information view for an augmented reality image according to an embodiment.

FIG. 4D illustrates a virtual information view for an augmented reality image according to an embodiment. In some embodiments, the rendering of a 3D image further includes the rendering of an information view 430 that provides information regarding one or more virtual objects that are contained in the virtual view of FIG. 4C. In some embodiments, the virtual view may appear only when the virtual object 420 illustrated in FIG. 4C is wholly or mostly within the user's viewing frustum. It may not be necessary for the information view 430 to be anchored to the environment in the same manner as virtual object 420, and thus the information view 430 may swim in relation to the actual objects in a view, and may, for example, be rendered to be in front of any actual objects in an augmented image such that the image is not occluded by the actual objects.

Figure 4E:
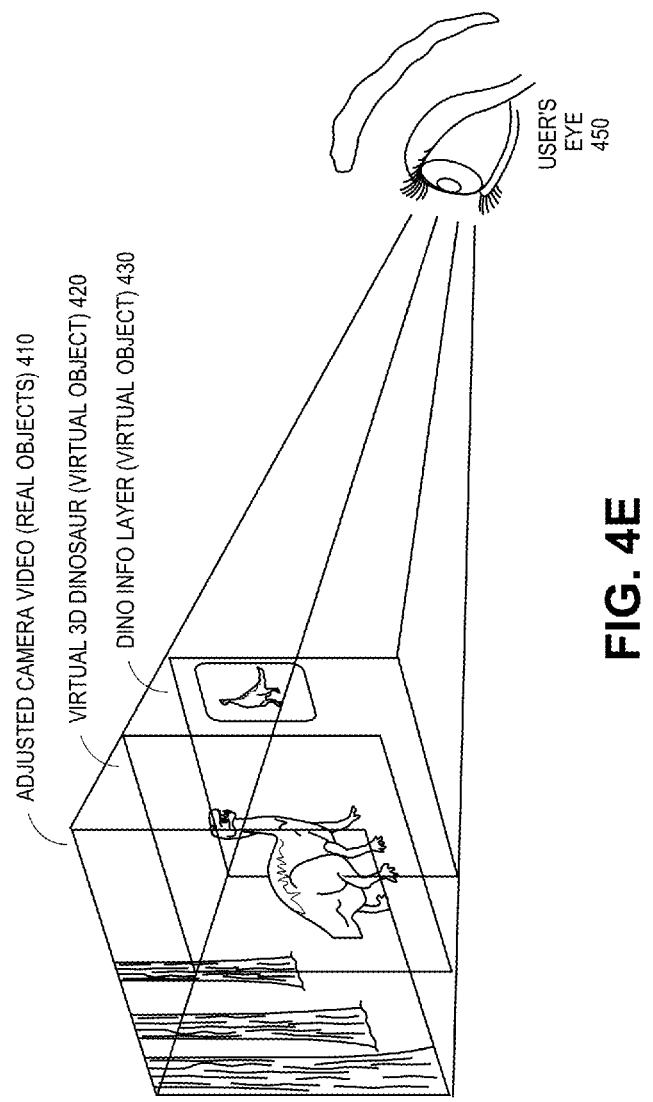
FIG. 4E illustrates a compositing stack for the generation of augmented reality image according to an embodiment.

FIG. 4E illustrates a compositing stack for the generation of augmented reality image according to an embodiment. As illustrated in FIG. 4E, a compositing stack for the generation of the augmented reality image for the view of the dominant eye of the user 450 includes a first layer providing adjusted camera video containing real objects 410 (as shown in FIG. 4B), which is overlaid with a second layer containing the virtual 3D dinosaur virtual object 420 (as shown in FIG. 4C), which is overlaid with a third layer containing the information view virtual object 430.

Figure 4F:
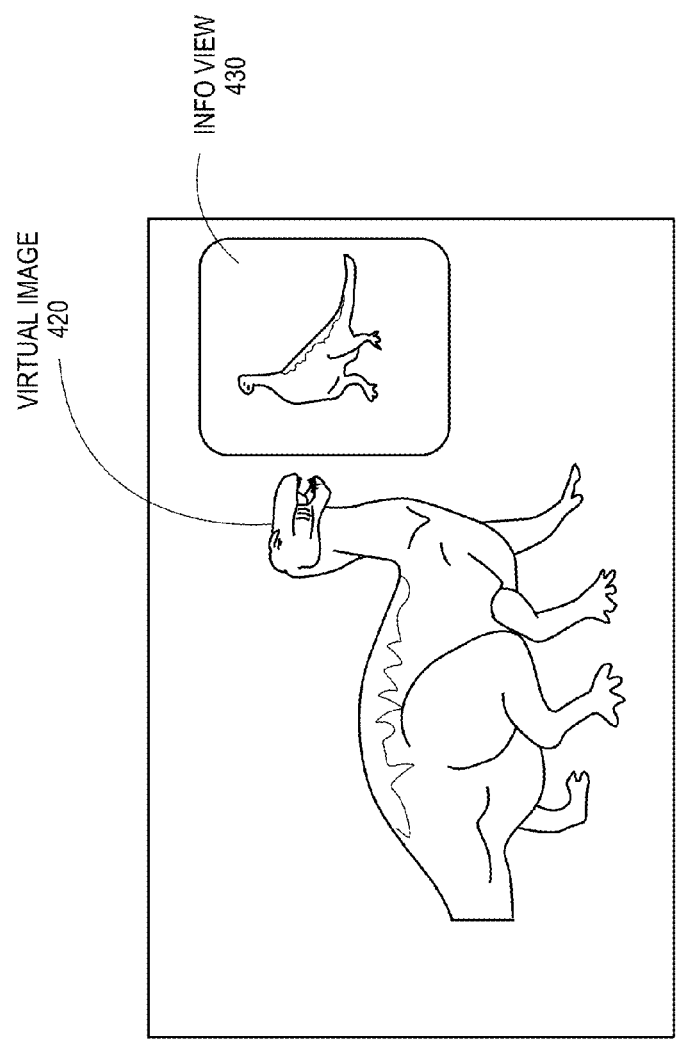
FIG. 4F illustrates virtual objects for the generation of an augmented reality image according to an embodiment.

FIG. 4F illustrates virtual objects for the generation of an augmented reality image according to an embodiment. As shown, a combined image includes the virtual image 420 overlaid with the information view 430.

Figure 4G:
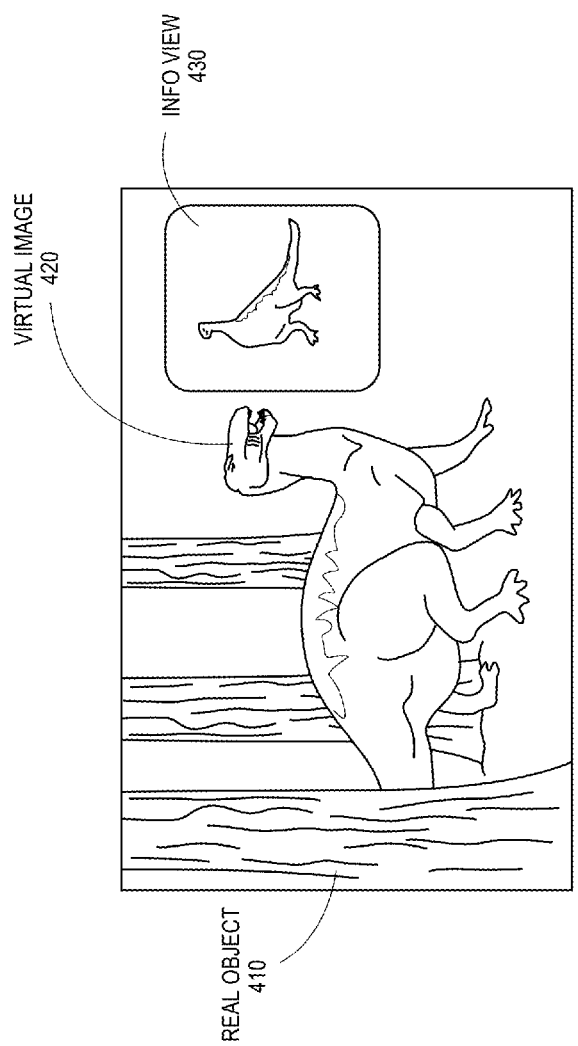
FIG. 4G illustrates a resulting composited augmented reality view according to an embodiment.

FIG. 4G illustrates a resulting composited augmented reality view according to an embodiment. As shown, the real objects 410 of the adjusted video camera view are overlaid with the virtual image 420 and the information view 430. With the adjusted camera view of the real environment the virtual image 420 is rendered to precisely match the silhouette boundary of the real objects 410, and the virtual image 420 is rendered to tie the virtual image 420 to the environment such that the virtual image does not appear to swim in the real environment.

Figure 5:
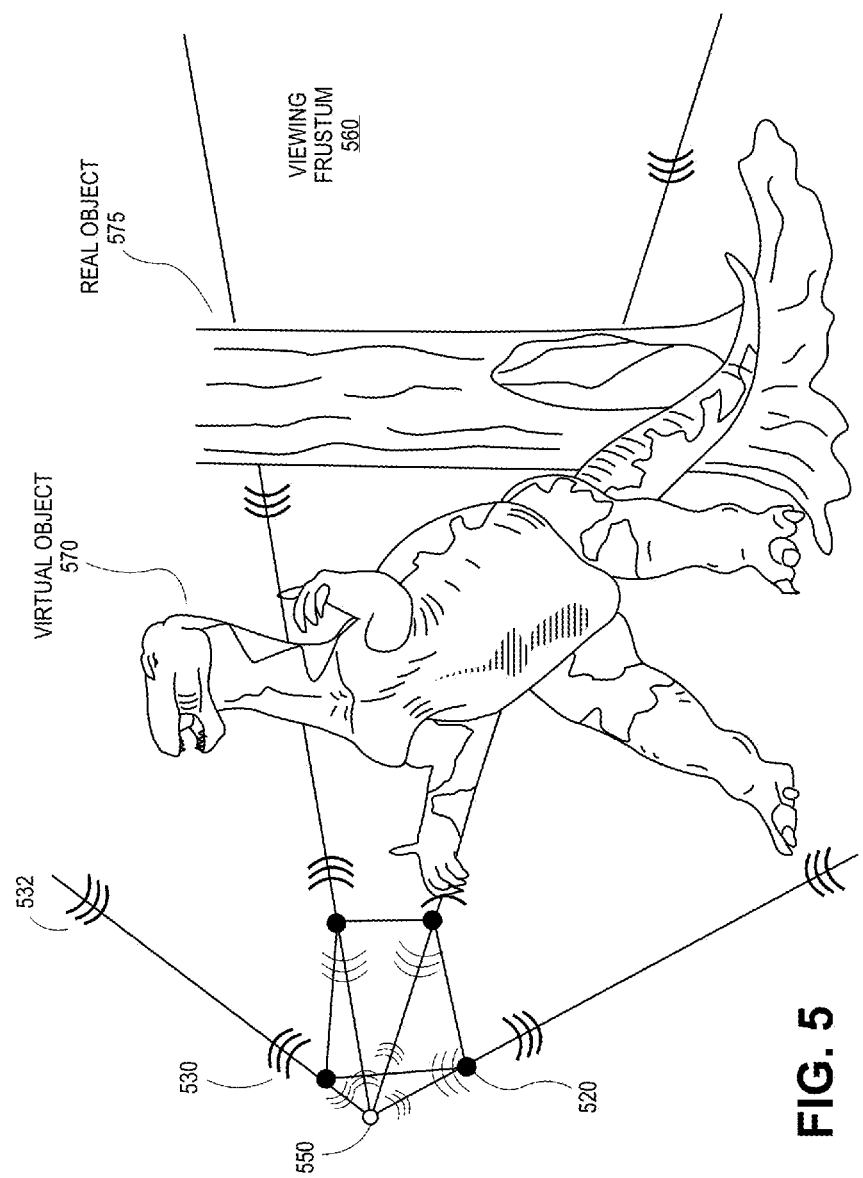
FIG. 5 illustrates placement of a virtual object in an augmented reality image according to an embodiment.

FIG. 5 illustrates placement of a virtual object in an augmented reality image according to an embodiment. In some embodiments, a mobile device utilizes multiple MIR elements 520 (which may include individual MIR subsystems) to transmit radar signals 530 and to receive return signals 532. As illustrated in FIG. 5, a viewing frustum 560 is from a perspective behind and to the right of the virtual object 570 (a dinosaur image), from the mobile device user's vantage point 550 (the dominant eye of the mobile device user). From the vantage point of a camera capturing FIG. 5, if the virtual object 570 actually existed in the real world, the occluded portion of the tail would be seen, but such portion of virtual object 570 is occluded by the real object 575 (tree) from the mobile device user's view.

In some embodiments, by means of the multiple antennae (four antennae in the FIG. 5 illustration) that face the user (wavefronts moving towards the mobile device user in the figure), the position of the user's dominant eye 550 can be accurately determined. The position 550 is the apex of the viewing frustum 560 illustrated in FIG. 5. In some embodiments, knowing the apex point, and knowing the precise position and orientation of the mobile device relative to the environment, (obtained by means of the four antennae and the wavefronts moving away from the user) a viewing matrix is generated that defines the viewing frustum 560 in the virtual world in alignment with the physical world as seen at an instant in time by the mobile device user, with the viewing matrix being made available to a 3D rendering program that is drawing the dinosaur virtual object 570.

In some embodiments, in order to occlude the appropriate portion (the tail, in this example,) of virtual objects, the virtual objects in the environment are rendered using a depth map that has been pre-initialized with a depth map. In some embodiments, the initialization of the depth map may be captured by the MIR components, wherein the depth of each point in the video raster is measured by the MIRs, or using a 3D camera component.

Figure 6:
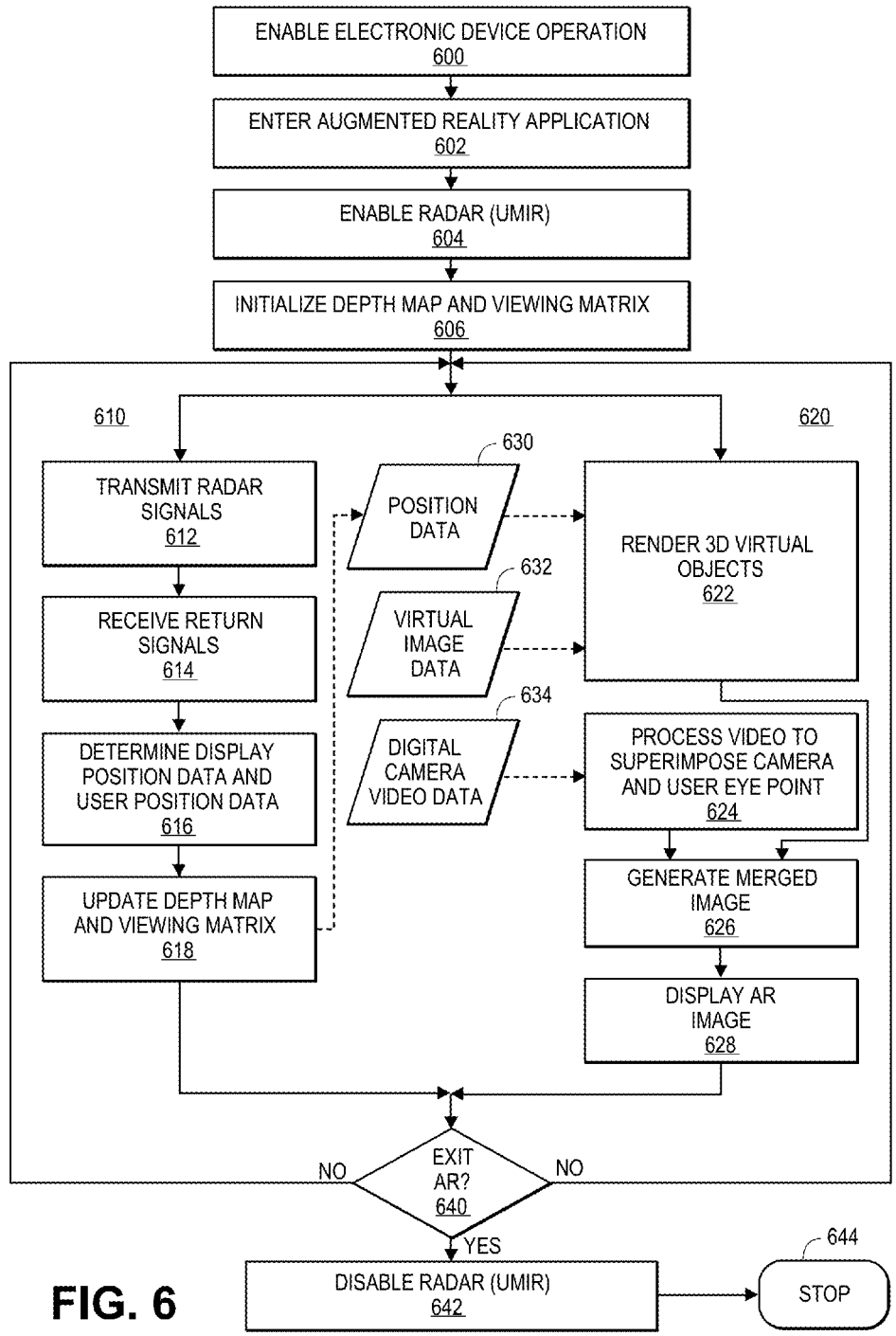
FIG. 6 is a flow chart to illustrate an embodiment of a process for determination of device position and orientation using micropower impulse radar.

FIG. 6 is a flow chart to illustrate an embodiment of a process for determination of device position and orientation using micropower impulse radar. In some embodiments, upon operation of an electronic device being enabled 600 and the device entering an augmented reality application 602, the MIR system of the electronic device may be enabled 604 (if the MIR components or sub-systems are not currently enabled) and an image depth map and viewing matrix may be initialized (where such initialization may be based on MIR operation, video camera operation, or other similar operation). In some embodiments, the augmented reality application may include a request for identification of the user's dominant eye if this information has not previously been received.

In some embodiments, the processing may include both a radar data process 610 and a 3D image generation process 620. In some embodiments, the radar data process 610 may include transmitting radar signals from multiple radar antennae of the electronic device 612, where such transmission includes transmission of signals both towards the real environment for determination of the display's position and orientation and towards the user for determination of the user's vantage point. In some embodiments, return signals are received at the MIR antennae 614, the return signals providing reflection from actual objects in the environment and from the user. In some embodiments, the process further includes determining display position data and user position data 616 and the updating of the depth map and viewing matrix 618, which define the depth of objects in the environment and provide an accurate location and orientation for the mobile device in relation to the actual objects in the environment and the position of the user in relation to the mobile device. In some embodiments, the generated data may be stored, as indicated by position data 632, for use in generation of augmented reality images. In some embodiments, the radar data process 610 operates quickly, and thus current position data 630 is available when needed for generation of images.

In some embodiments, the 3D image generation process 620 may include rendering of virtual image objects 622, which may include obtaining the position data 630 and certain virtual image data from memory 632. In some embodiments, the process further includes obtaining digital camera video data 634 and processing the video data to superimpose the camera data and the user's dominant eye point 624 to generate an adjusted camera video for the user's viewpoint. In some embodiments, the process includes generation of merged image data 626 by layering of the virtual image with the adjusted camera view, wherein the merged image data utilizes the image depth map and viewing matrix to accurately position virtual images and provide accurate occlusion of the virtual images, resulting in a natural placement of the virtual image in the merged image data according to the current viewing frustum of the user. In some embodiments, the process includes displaying an augmented reality image based upon the merged image data 628.

In some embodiments, if there is no exit from the augmented reality application, the radar data process 610 and the 3D image generation process 620 continue. If there is an exit from the augmented reality application 640, then the MIR system or systems may be disabled 642 (if appropriate) and process ended 644.

Figure 7:
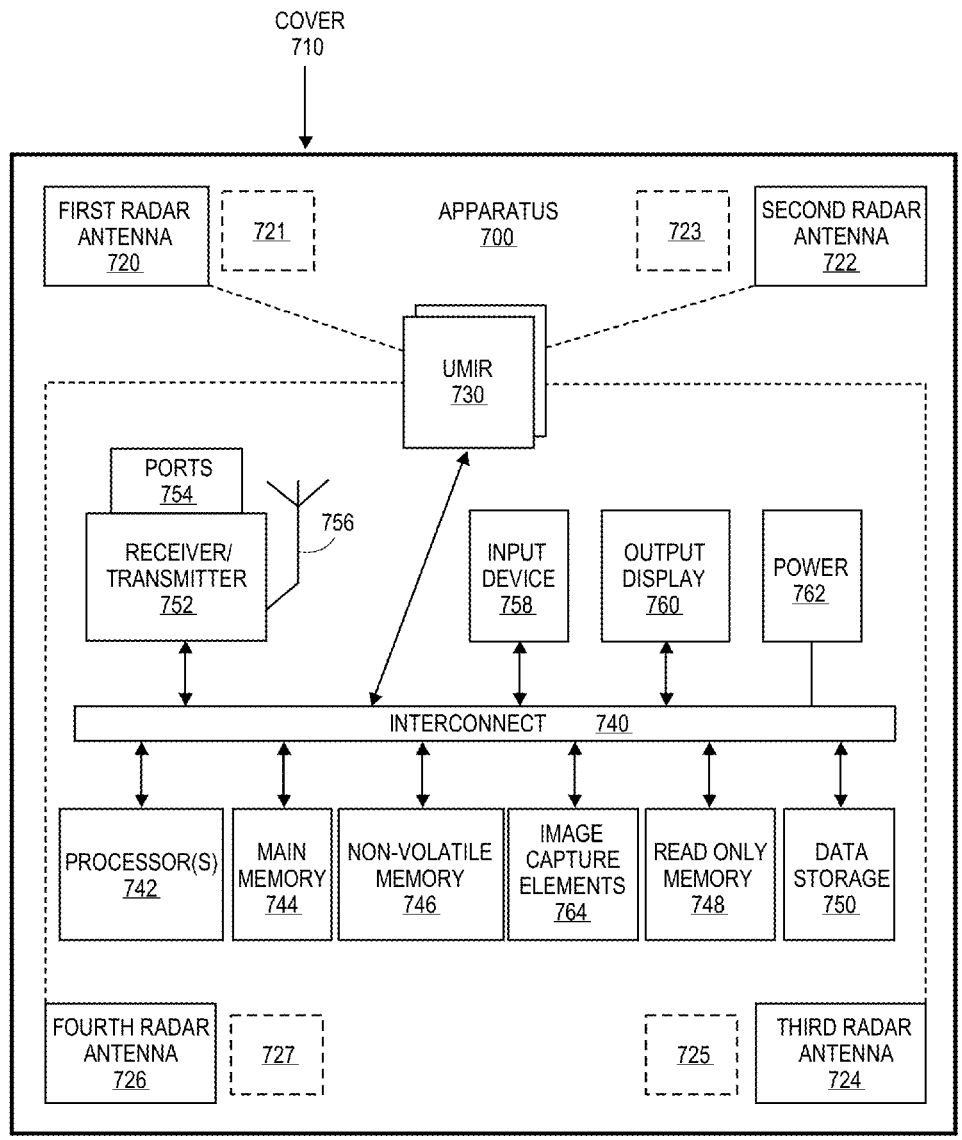
FIG. 7 is an illustration of an embodiment of an electronic apparatus or system to provide for determination of apparatus position and orientation using micropower impulse radar.

FIG. 7 is an illustration of an embodiment of an electronic apparatus or system to provide for determination of display position and orientation using micropower impulse radar. In this illustration, certain standard and well-known components that are not germane to the present description are not shown. Elements shown as separate elements may be combined, including, for example, an SoC (System on Chip) combining multiple elements on a single chip. The apparatus or system may include, but is not limited to, a mobile device such as a tablet computer.

Under some embodiments, the apparatus or system 700 (referred to generally herein as an apparatus) includes a cover 710. In some embodiments, the apparatus further includes multiple radar antennae, including a first radar antenna 720, a second radar antenna 722, a third radar antenna 724, and a fourth radar antenna 726 for the transmission and reception of video images. While connections for only a first set of antennae are shown for ease of illustration, in some embodiments the mobile device includes a first set of antennae to track object positions in first direction, such as the illustrated antennae 720, 722, 724, and 726, and a second set of antennae to track a position of the vantage point of a user of the mobile device (the dominant eye of the user of the mobile device) in a second direction, such as an additional set of antennae 721, 723, 725, and 727. In some embodiments, the radar antennae may be spread spatially to allow for separation of the timing of each impulse signal, such as, for example, the location of an antenna in each corner of the apparatus 700. In some embodiments, each of the antennae is in a different location in the apparatus. In some embodiments, the antennae 720, 722, 724, 726 transmit and receive radar data a plurality of MIR components or sub-systems 730. In some embodiments, the antennae are directed towards an environment for determination of a position and orientation of the apparatus 700 with respect to the objects in the environment. In some embodiments, there is an additional set of antennae 721, 723, 725, 727 directed in an opposite direction (towards a user of the apparatus) to determine the position of the vantage point of the user in relation to the apparatus 700.

In some embodiments, the apparatus 700 includes an interconnect 740 or other communication means for transmission of data, the MIR components 730 being coupled with the interconnect 740. The interconnect 740 is illustrated as a single interconnect for simplicity, but may represent multiple different interconnects or buses and the component connections to such interconnects may vary. The interconnect 740 shown in FIG. 7 is an abstraction that represents any one or more separate physical buses, point-to-point connections, or both connected by appropriate bridges, adapters, or controllers.

In some embodiments, the apparatus 700 may include a processing means such as one or more processors 742 coupled to the interconnect 740 for processing information. The processors 742 may comprise one or more physical processors and one or more logical processors. In some embodiments, the processors may include one or more general-purpose processors or special-processor processors. In some embodiments, the processors 742 operate to process radar signal data to generate data describing the position and orientation of the apparatus in relation to real objects in an environment, the vantage point of a user of the apparatus 700, or both.

In some embodiments, the apparatus includes one or more image capture elements 764, such as a camera, which may include the capture of images of an environment for generation of augmented reality images. In some embodiments, the image capture elements include a 3D camera, wherein the 3D camera may be utilized in the initialization of position data for the apparatus 700.

In some embodiments, the apparatus 700 further comprises a random access memory (RAM) or other dynamic storage device or element as a main memory 744 for storing information and instructions to be executed by the processors 742. The apparatus 700 may include one or more non-volatile memory elements 746, including, for example, flash memory, for the storage of certain elements. The apparatus 700 also may comprise a read only memory (ROM) 748 or other static storage device for storing static information and instructions for the processors 742, and data storage 750, such as a solid state drive, for the storage of data. In some embodiments, memory of the apparatus 700 may include storage of data related to the determination of position data, such as which of the user's eyes is dominant, and the generation of image data for the presentation of augmented reality images.

In some embodiments, the apparatus 700 includes one or more transmitters or receivers 752 coupled to the interconnect 740. In some embodiments, the apparatus 700 may include one or more antennae 756 for the transmission and reception of data via wireless communication, where the antennae may include bipole and monopole antennae, and one or more ports 754 for the transmission and reception of data via wired communications.

In some embodiments, the apparatus 700 includes one or more input devices 758 for the input of data, including hard and soft buttons, a joy stick, a mouse or other pointing device, voice command system, or gesture recognition system.

In some embodiments, the apparatus 700 includes an output display 760, where the display 760 may include a liquid crystal display (LCD) or any other display technology, for displaying information or content to a user. In some environments, the display 760 may include a touch-screen that is also utilized as at least a part of an input device 758. In some embodiments, the output display 760 may be utilized in the display of augmented reality images.

The apparatus 700 may also comprise a battery or other power source 762, which may include a solar cell, a fuel cell, a charged capacitor, near field inductive coupling, or other system or device for providing or generating power in the apparatus 700. The power provided by the power source 762 may be distributed as required to elements of the apparatus 700.

In the description above, for the purposes of explanation, numerous specific details are set forth in order to provide a thorough understanding of the described embodiments. It will be apparent, however, to one skilled in the art that embodiments may be practiced without some of these specific details. In other instances, well-known structures and devices are shown in block diagram form. There may be intermediate structure between illustrated components. The components described or illustrated herein may have additional inputs or outputs that are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a computer-readable medium having stored thereon computer program instructions, which may be used to program a computer (or other electronic devices) for execution by one or more processors to perform a process according to certain embodiments. The computer-readable medium may include, but is not limited to, magnetic disks, optical disks, compact disk read-only memory (CD-ROM), and magneto-optical disks, read-only memory (ROM), random access memory (RAM), erasable programmable read-only memory (EPROM), electrically-erasable programmable read-only memory (EEPROM), magnet or optical cards, flash memory, or other type of computer-readable medium suitable for storing electronic instructions. Moreover, embodiments may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present embodiments. It will be apparent to those skilled in the art that many further modifications and adaptations can be made. The particular embodiments are not provided to limit the concept but to illustrate it. The scope of the embodiments is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments, various features are sometimes grouped together in a single embodiment, figure, or description thereof for the purpose of streamlining the disclosure and aiding in the understanding of one or more of the various novel aspects. This method of disclosure, however, is not to be interpreted as reflecting an intention that the claimed embodiments requires more features than are expressly recited in each claim. Rather, as the following claims reflect, novel aspects lie in less than all features of a single foregoing disclosed embodiment. Thus, the claims are hereby expressly incorporated into this description, with each claim standing on its own as a separate embodiment.

In some embodiments, an embodiment of an apparatus includes a display to present images; radar components to generate radar signal pulses and to generate distance data based on received return signals; radar antennae to transmit the radar signal pulses and to receive the return signals; and a processor to process signals and data, wherein the processor is to: process the return signals received by the radar antennae to determine a position and orientation of the display with respect to real objects in an environment and to determine a position of a vantage point of a user of the apparatus, and generate an augmented image including rendering a virtual object and superimposing the virtual object on an image including one or more real objects, the rendering of the virtual image being based at least in part on the determined position and orientation of the display and the determined vantage point of the user of the apparatus.

In some embodiments, the radar components are micropower impulse radar (MIR) components.

In some embodiments, the radar antennae include a first set of radar antennae to transmit radar signal pulses in a first direction and a second set of radar antennae to transmit radar signal pulses in a second direction.

In some embodiments, processing the return signals includes updating a depth map providing distances of real objects.

In some embodiments, processing the return signals includes updating a viewing matrix, the viewing matrix defining a viewing frustum of a user of the apparatus.

In some embodiments, rendering the virtual image excludes a portion of the virtual image that is occluded by a first real object, the occlusion being based on the depth map and the viewing matrix.

In some embodiments, the processor is to preprocess the image of the environment to appear to have been captured from the vantage point of the user.

In some embodiments, the apparatus is a mobile device. In some embodiments, each of the radar antennae is in a different location in the mobile device.

In some embodiments, the vantage point of the user is the dominant eye of the user.

In some embodiments, a method includes: capturing an image of an environment with a camera; transmitting radar signal pulses from radar antennae in a mobile device; receiving return signals at the radar antennae; processing the return signals received at the radar antennae to determine a position and orientation of a display with respect to real objects in the environment and a position of a vantage point of a user of the mobile device; rendering a 3D (three-dimensional) virtual object, wherein the rendering of the virtual object is based at least in part on the determined position and orientation of the display and the determined position of the vantage point of the user; and generating an augmented reality image by superimposing the virtual object on the image of the environment.

In some embodiments, the radar signal pulses are transmitted using a micropower impulse radar (MIR) system.

In some embodiments, transmitting the radar signal pulses includes: transmitting radar signal pulses from a first set of radar antennae in the mobile device towards the environment; transmitting radar signal pulses from a second set of radar antennae in the mobile device towards a user of the mobile device; and receiving return signals at the first set and second set of radar antennae.

In some embodiments, the method further includes preprocessing the image of the environment to appear to have been captured from the vantage point of the user.

In some embodiments, processing the return signals received at the radar antennae includes updating a depth map providing distances of objects in the environment.

In some embodiments, processing the return signals received at the radar antennae includes updating a viewing matrix, the viewing matrix defining a viewing frustum of the user of the mobile device.

In some embodiments, a mobile device includes: a touchscreen display to present images; a camera to capture an image of an environment; a micropower impulse radar (MIR) system to generate radar signal pulses and to generate distance data based on received return signals, the MIR system including radar antennae to transmit and receive radar signal pulses; and a processor to process signals and data, wherein the processor is to: process return signals received by the radar antennae to determine a position and orientation of the display with respect to real objects in the environment, and to determine a position of a vantage point of a user of the mobile device, and generate an augmented image including rendering one or more virtual objects and superimposing the one or more virtual objects on the image of the environment, the rendering of the one or more virtual images being based at least in part on the determined position and orientation of the display and the vantage point of the user of the mobile device.

In some embodiments, processing the return signals includes updating a depth map providing distances of real objects.

In some embodiments, processing the return signals includes updating a viewing matrix, the viewing matrix defining a viewing frustum of the user of the mobile device.

In some embodiments, rendering a first virtual image excludes a portion of a first virtual image that is occluded by a first real object, the occlusion being based on the depth map and the viewing matrix.

In some embodiments, the radar antennae include a first set of radar antennae to transmit radar signal pulses in a first direction and a second set of radar antennae to transmit radar signal pulses in a second direction.

In some embodiments, the MIR system is an ultra-wideband micropower impulse radar (UMIR) system.

In some embodiments, the MIR system includes a plurality of MIR sub-systems.

In some embodiments, a non-transitory computer-readable storage medium having stored thereon data representing sequences of instructions that, when executed by a processor, cause the processor to perform operations including: capturing an image of an environment; transmitting micropower impulse radar signal pulses from radar antennae; receiving return signals at the radar antennae; processing the return signals to determine a position and orientation of a display screen of a mobile device with respect to real objects in the environment and to determine a position of a dominant eye of a user of the mobile device; rendering a virtual object, wherein the rendering of the virtual object is based at least in part on the determined position and orientation of the display and the determined position of the dominant eye of the user; and generating an augmented reality image by superimposing the virtual object on the image of the environment.

In some embodiments, processing the return signals received at the radar antennae includes updating a depth map providing distances of objects in the environment.

In some embodiments, processing the return signals received at the radar antennae includes updating a viewing matrix, the viewing matrix defining a viewing frustum of a user of the mobile device.

In some embodiments, the instructions further include instructions to cause the processor to perform operations including adjusting the image of the environment to match the view of the dominant eye of the user.

In some embodiments, the instructions further include instructions to cause the processor to perform operations including displaying the augmented image on the display screen.

In some embodiments, the instructions further include instructions to cause the processor to perform operations including requesting identification of the dominant eye of the user.

In some embodiments, an apparatus includes a means for capturing an image of an environment; a means for transmitting micropower impulse radar signal pulses from a plurality of radar antennae; a means for receiving return signals at the plurality of radar antennae; a means for processing the return signals to determine a position and orientation of a display screen of a mobile device with respect to real objects in the environment and to determine a position of a dominant eye of a user of the mobile device; a means for rendering a virtual object, wherein the rendering of the virtual object is based at least in part on the determined position and orientation of the display and the determined position of the dominant eye of the user; and a means for generating an augmented reality image by superimposing the virtual object on the image of the environment.

In some embodiments, the means for processing the return signals received at the plurality of radar antennae includes a means for updating a depth map providing distances of objects in the environment.

In some embodiments, the means for processing the return signals received at the plurality of radar antennae includes a means for updating a viewing matrix, the viewing matrix defining a viewing frustum of a user of the mobile device.

In some embodiments, the apparatus further includes a means for adjusting the image of the environment to match the view of the dominant eye of the user.

In some embodiments, the apparatus further includes a means for displaying the augmented image on the display screen.

What is claimed is:

1. A mobile device comprising:
   a front face and an opposite rear face;
   a display on the front face to present images;
   radar components to generate a plurality of radar signal pulses and to generate distance data based on received return signals, wherein the radar components are micropower impulse radar (MIR) components;
   a plurality of rear facing radar antennae to transmit a first plurality of radar signal pulses in a first direction and to receive a first set of return signals resulting from reflection of the first plurality of radar signal pulses;
   a plurality of front facing radar antennae to transmit a second plurality of radar signal pulses in an opposite second direction and to receive a second set of return signals resulting from reflection of the second plurality of radar signal pulses, the second plurality of radar pulses being directed towards a user of the mobile device; and
   a processor to process signals and data, wherein the processor is to:
      process the first set of return signals received by the plurality of rear facing radar antennae to determine a current position and orientation of the display with respect to real objects in an environment,
      process the second set of return signals received by the plurality of front facing radar signals to determine and track a position of a current vantage point of a user of the mobile device, wherein the current vantage point of the user is a current position of a dominant eye of the user in relation to the mobile device, and
      generate and update an augmented image including rendering a virtual object and superimposing the virtual object on an image including one or more real objects, the rendering of the virtual image being based at least in part on the determined current position and orientation of the display and the determined current vantage point of the user of the mobile device, wherein generation of the augmented image includes the processor to generate and update a viewing matrix for the mobile device, the viewing matrix being updated to define a viewing frustum that corresponds to the current vantage point of the user of the mobile device.

2. The mobile device of claim 1, wherein processing the first set of return signals includes updating a depth map providing distances of real objects.

3. The mobile device of claim 1, wherein rendering the virtual image excludes a portion of the virtual image that is occluded by a first real object, the occlusion being based on the depth map and the viewing matrix.

4. The mobile device of claim 1, wherein the processor is to preprocess the image of the environment to appear to have been captured from the current vantage point of the user.

5. The mobile device of claim 1, wherein each of the plurality of rear facing radar antennae is in a different location in the mobile device.

6. The mobile device of claim 1, further comprising a noise source to provide noise data to the radar components to vary an amount of time between signal pulses.

7. A method comprising:
   capturing an image of an environment with a camera of a mobile device;
   transmitting a first plurality of radar signal pulses in a first direction from a plurality of rear facing radar antennae in the mobile device;
   transmitting a second plurality of radar signal pulses in a second opposite direction from a plurality of front facing radar antennae in the mobile device, the second plurality of radar signal pulse being directed towards a user of the mobile device;
   receiving a first set of return signals resulting from reflection of the first plurality of radar signal pulses, the first set of return signals being received at the plurality of rear facing radar antennae, and receiving a second set of return signals resulting from reflection of the second plurality of radar signal pulses, the second set of return signals being received at the plurality of front facing radar antennae;
   processing the first set of return signals received at the plurality of rear facing radar antennae to determine a current position and orientation of a display screen of the mobile device with respect to real objects in the environment and processing the second set of return signals received at the plurality of front facing radar antennae to determine and track a position of a current vantage point of the user of the mobile device, wherein the current vantage point of the user is a current position of a dominant eye of the user in relation to the mobile device;
   rendering a 3D (three-dimensional) virtual object, wherein the rendering of the virtual object is based at least in part on the determined current position and orientation of the display screen and the determined position of the current vantage point of the user; and
   generating an augmented reality image by superimposing the virtual object on the image of the environment, wherein generation of the augmented image includes generating and updating a viewing matrix for the mobile device, the viewing matrix being updated to define a viewing frustum that corresponds to the current vantage point of the user of the mobile device;
   wherein the radar signal pulses are transmitted using a micropower impulse radar (MIR) system.

8. The method of claim 7, further comprising preprocessing the image of the environment to appear to have been captured from the current vantage point of the user.

9. The method of claim 7, wherein processing the return signals received at the plurality of rear facing radar antennae includes updating a depth map providing distances of objects in the environment.

10. The method of claim 7, further comprising measuring a time of flight of radar signal pulses and reflected return signals at each antenna of the plurality of front facing radar antennae and each antenna of the plurality of rear facing radar antennae.

11. A mobile device comprising:
a front face and an opposite rear face;
a touchscreen display on the front face to present images;
a camera to capture an image of an environment;
a micropower impulse radar (MIR) system to generate a first plurality of radar signal pulses in a first direction and to generate a first set distance data based on a first set of received return signals resulting from reflection of the first plurality of radar signal pulses, and to generate a second plurality of radar signal pulses in a second opposite direction and to generate a second set of distance data based on a first set of received return signals resulting from reflection of the second plurality of radar signal pulses, the MIR system including a plurality of rear facing radar antennae and a plurality of front facing radar antennae to transmit the radar signal pulses and receive the return signals resulting from reflection of the radar signal pulses; and
a processor to process signals and data, wherein the processor is to:
process the first set of return signals received by the plurality of rear facing radar antennae to determine a current position and orientation of the display with respect to real objects in the environment,
process the second set of return signals received by the plurality of front facing radar signals to determine and track a position of a current vantage point of a user of the mobile device, wherein the current vantage point of the user is a current position of a dominant eye of the user in relation to the mobile device, and
generate an augmented image including rendering one or more virtual objects and superimposing the one or more virtual objects on the image of the environment, the rendering of the one or more virtual images being based at least in part on the determined current position and orientation of the display and the determined current vantage point of the user of the mobile device, wherein generation of the augmented image includes the processor to generate and update a viewing matrix for the mobile device, the viewing matrix being updated to define a viewing frustum that corresponds to the current vantage point of the user of the mobile device.

12. The mobile device of claim 11, wherein processing the return signals includes updating a depth map providing distances of real objects.

13. The mobile device of claim 11, wherein rendering a first virtual image excludes a portion of a first virtual image that is occluded by a first real object, the occlusion being based on a depth map and the viewing matrix.

14. The mobile device of claim 11, further comprising a cover, wherein the plurality of rear facing radar antennae include an antenna mounted in each corner of a front of the cover, and wherein the plurality of front facing radar antennae include an antenna mounted in each corner of a rear of the cover.

15. A non-transitory computer-readable storage medium having stored thereon data representing sequences of instructions that, when executed by a processor, cause the processor to perform operations comprising:
capturing an image of an environment with a camera of a mobile device;
transmitting a first set of micropower impulse radar signal pulses in a first direction from a plurality of rear facing radar antennae in the mobile device;
transmitting a second set of micropower impulse radar signal pulses in a second opposite direction from a plurality of front facing radar antennae in the mobile device, the second set of micropower impulse radar signal pulses being directed towards a user of the mobile device;
receiving a first set of return signals resulting from reflection of the first plurality of radar signal pulses, the first set of return signals being received at the plurality of rear facing radar antennae, and receiving a second set of return signals resulting from reflection of the second plurality of radar signal pulses, the second set of return signals being received at the plurality of front facing radar antennae;
processing the first set return signals received at the plurality of rear facing radar antennae to determine a current position and orientation of a display screen of the mobile device with respect to real objects in the environment and processing the second set of return signals received at the plurality of front facing radar antennae to determine and track a current position of a dominant eye of a user of the mobile device in relation to the mobile device;
rendering a virtual object, wherein the rendering of the virtual object is based at least in part on the determined current position and orientation of the display screen and the determined current position of the dominant eye of the user; and
generating an augmented reality image by superimposing the virtual object on the image of the environment, wherein generation of the augmented image includes the processor to generate and update a viewing matrix for the mobile device, the viewing matrix being updated to define a viewing frustum that corresponds to the current position of the dominant eye of the user of the mobile device.

16. The medium of claim 15, wherein processing the first set of return signals received at the plurality of rear facing radar antennae includes updating a depth map providing distances of objects in the environment.

17. The medium of claim 15, further comprising instructions that, when executed by the processor, cause the processor to perform operations comprising:
adjusting the image of the environment to match the view of the dominant eye of the user.

18. The medium of claim 15, further comprising instructions that, when executed by the processor, cause the processor to perform operations comprising:
displaying the augmented image on the display screen.

* * * * *